US011082606B1

(12) United States Patent
Gamadia et al.

(10) Patent No.: US 11,082,606 B1
(45) Date of Patent: Aug. 3, 2021

(54) METHOD AND SYSTEM FOR ROBUST CONTRAST BASED AUTO FOCUS IN LOW LIGHT (71) Applicant: Apple Inc., Cupertino, CA (US)

(72) Inventors: Mark N. Gamadia, Campbell, CA (US); Yingjun Bai, San Jose, CA (US); Muge Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 16/127,436

(22) Filed: Sep. 11, 2018

(51) Int. Cl.
*H04N 5/232* (2006.01)
*G06K 9/32* (2006.01)
*G06T 7/80* (2017.01)

(52) U.S. Cl.
CPC ..... *H04N 5/232123* (2018.08); *G06K 9/3233* (2013.01); *G06T 7/80* (2017.01); *H04N 5/23216* (2013.01); *G06T 2207/20024* (2013.01)

(58) Field of Classification Search
CPC ........... H04N 5/23212; H04N 5/23216; H04N 5/232123; H04N 5/232121; H04N 5/232122; H04N 5/232127; H04N 5/232133; G06K 9/32; G06K 9/3233; G06K 9/3241; G06T 7/80; G06T 2207/20024; G06T 7/11; G02B 7/36–38
USPC ................... 348/349–356; 396/127
See application file for complete search history.

(56) References Cited

U.S. PATENT DOCUMENTS

| | | | | |
|---|---|---|---|---|
| 7,589,781 B2* | 9/2009 | Huang | ............... | H04N 5/23212 348/222.1 |
| 7,609,319 B2* | 10/2009 | Kobayashi | ......... | H04N 5/23212 348/355 |
| 7,702,229 B2* | 4/2010 | Schilling-Benz | .......................... | H04N 5/23212 250/201.8 |
| 7,729,601 B1* | 6/2010 | Tsai | .......................... | G02B 7/08 396/106 |
| 7,769,286 B2* | 8/2010 | Subbotin | .................. | G02B 7/36 250/201.7 |
| 8,446,519 B2* | 5/2013 | Suda | .................. | H04N 5/23212 348/355 |
| 9,477,138 B2* | 10/2016 | Brunner | ............. | H04N 5/23212 |
| 9,525,814 B2* | 12/2016 | Chen | .................. | H04N 5/23212 |
| 10,051,174 B2* | 8/2018 | Miyazawa | ............... | G02B 7/34 |
| 2005/0212950 A1* | 9/2005 | Kanai | ................ | H04N 5/23212 348/345 |
| 2012/0281132 A1* | 11/2012 | Ogura | ................ | H04N 5/23212 348/348 |

(Continued)

Primary Examiner — Twyler L Haskins
Assistant Examiner — Akshay Trehan
(74) Attorney, Agent, or Firm — Blank Rome LLP (57) ABSTRACT

Determining a focus setting includes determining a plurality of regions of interest in a view of a scene, and, for each of the plurality of regions of interest, obtaining a set of image data for each of multiple focal positions, and then applying focus filters to the set of image data for each of the plurality of focal positions for each of the regions of interest to obtain a set of focus scores, i.e., a focus score for each focus filter applied to the set of image data for each of the focal positions. Further, determining a confidence value associated with each of the sets of focus scores, selecting a subset of the sets of focus scores based on the confidence values associated with each of the sets of focus scores, and determining a focus setting for the scene based on the selected subset of the focus scores.

20 Claims, 7 Drawing Sheets

(56) References Cited

U.S. PATENT DOCUMENTS

| | | | |
|---|---|---|---|
| 2013/0342750 A1* | 12/2013 | Foote | H04N 5/23212 348/349 |
| 2014/0118611 A1* | 5/2014 | Hamano | H04N 5/23212 348/350 |
| 2015/0109479 A1* | 4/2015 | Kimoto | H04N 5/378 348/231.99 |
| 2016/0014326 A1* | 1/2016 | Lee | G06K 9/52 348/354 |
| 2016/0021295 A1* | 1/2016 | Krestyannikov | H04N 5/23212 348/345 |
| 2016/0094782 A1* | 3/2016 | Tay | H04N 5/232123 382/255 |
| 2016/0142619 A1* | 5/2016 | Kanda | G06K 9/522 348/352 |
| 2017/0339331 A1* | 11/2017 | Higurashi | H04N 5/2254 |
| 2018/0182125 A1* | 6/2018 | Tanaka | G02B 7/38 |

\* cited by examiner

METHOD AND SYSTEM FOR ROBUST CONTRAST BASED AUTO FOCUS IN LOW LIGHT

BACKGROUND

This disclosure relates generally to the field of digital image capture and processing, and more particularly to the field of improving autofocus techniques.

Auto focus (AF) in low light on mobile devices is an outstanding problem, even with the latest technologies, such as image sensors using dual pixels, phase detection autofocus (PDAF), or even time-of-flight (ToF)-assisted autofocus. For example, as light levels drop, PDAF may have difficulties to stably drive the lens to the in-focus position. In such conditions, a contrast-based autofocus (CBAF) or ToF-assisted CBAF may be employed as a backup procedure to provide autofocus. However, these procedures may also struggle in certain low light situations.

CBAF aims to determine an in-focus position of the lens that maximizes the sharpness/autofocus scores within one or more focus regions-of-interest (ROIs). Some implementations of ToF-assisted CBAF aim to speed up the search for the maximum sharpness score by restricting the search range around the lens position that maps to the object distance, e.g., as detected by a ToF sensor or other depth-estimation modality. Whether CBAF or ToF-assisted CBAF is used, it may be desirable to obtain robust measures of image sharpness in low light conditions in order to improve the performance of AF systems.

SUMMARY

In one embodiment, a method for improving autofocus is described. The method may include determining a focus setting for a camera, wherein determining the focus setting comprises: determining a plurality of regions of interest in a view of a scene, and for each of the plurality of regions of interest, capturing image data at a plurality of focus settings to obtain a set of image data for each of the plurality of focus settings. The method also includes applying a plurality of focus filters to the set of image data for each of the plurality of focus settings for each of the plurality of regions of interest to obtain a plurality of sets of focus scores, determining a confidence value associated with each of the plurality of sets of focus scores, and selecting a subset of the plurality of sets of focus scores based on the confidence values associated with each of the plurality of sets of focus scores. A final focus score is determined for the scene based on the selected subset of the plurality of sets of focus scores.

In another embodiment, the various methods may be embodied in computer executable program code and stored in a non-transitory storage device. In yet another embodiment, the method may be implemented in an electronic device having image capture capabilities.

DETAILED DESCRIPTION

This disclosure pertains to systems, methods, and computer readable media for improving autofocus. In general, techniques include identifying one or more regions of interest in a scene, and utilizing an autofocus sweep to capture image data for the region of interest at multiple focus settings. The result is obtaining a set of image data for each of the focus settings for each region of interest. Multiple focus filters are applied to each set of image data to obtain a set of focus scores. Said another way, image data is captured for each region of interest at multiple focus settings, and multiple filters are applied to each set of image data for each region of interest across the multiple focus settings. The result of applying each focus filter may be a set of focus scores for a region of interest across multiple focus settings. For example, a set of focus scores may be obtained for a particular region of interest and a particular focus filter. The combined focus scores for some or all of the regions of interest and/or some or all of the focus filters may be considered a plurality of sets of focus scores.

In one or more embodiments, a confidence value is determined for each set of focus scores. The confidence value may be based on, for example, a signal to noise ratio. The confidence values may be used to select a subset of the plurality of sets of focus scores (e.g., wherein each set of focus scores is a set of filtered data utilizing a particular filter for a particular region of interest). The subset of the plurality of sets of focus scores may be determined in a number of ways, such as based on a threshold confidence score, or by a top percentile or total number of highest confidence scores. A final focus setting for the scene may be determined based on the selected subset of the plurality of sets of focus scores. Then, an image may be captured of the scene using the determined final focus setting.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images at multiple depths and, as a result, multiple points of focus. Further in one or more embodiments, the lens may refer to any kind of lens, such as a telescopic lens or a wide angle lens. As such, the term lens can mean a single optical element or multiple elements configured into a stack or other arrangement. For purposes of this disclosure, the term "camera" refers to a single lens assembly along with the sensor element and other circuitry utilized to capture an image.

Figure 1:
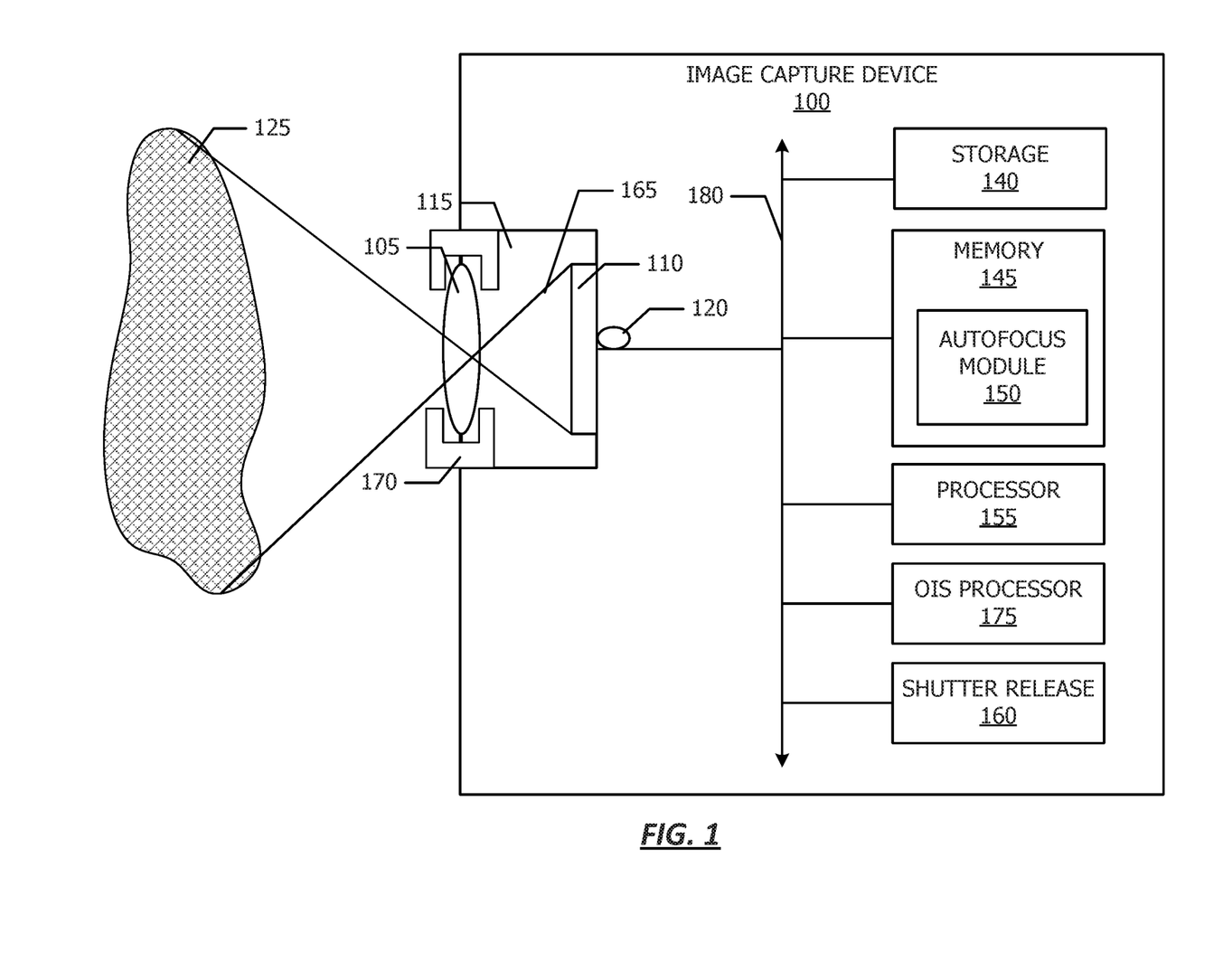
FIG. 1 shows, in block diagram form, a simplified image capture device according to one or more embodiments.

Referring to FIG. 1, a simplified block diagram of an image capture device 100 is depicted, in accordance with one or more embodiments. Image capture device 100 may be part of a mobile electronic device, such as a tablet computer, mobile phone, laptop computer, portable music/video player, or any other electronic device that includes a camera system. Further, in one or more embodiments, image capture device 100 may be part of any other multifunction device that includes a camera and supports OIS, such as those described below with respect to FIG. 7.

The image capturing device 100 includes, but is not limited to, a camera module 115, a shutter release 160, storage 140, a memory 145 and a processor 155. The processor 155 may drive interaction between a plurality of the components comprising device 100. The processor 155 may be any suitably programmed processor within device 100.

In some embodiments, the processor 155 may be a primary processor such as a microprocessor or central processing unit (not shown). The processor 155 may communicate with the other illustrated components across a bus 180. The bus 180 can be any subsystem adapted to transfer data within the device 100. The bus 180 can be a plurality of computer buses and include additional circuitry to transfer data and generally facilitate inter-component communication (e.g., a switch).

The camera module 115 incorporates many of the components utilized to capture an image, such as a lens 105 and an image sensor 110. The image sensor 110 of the camera module 115 can be, for example, a charge-coupled device (CCD) or complementary metal-oxide-semiconductor (CMOS) sensor. The image sensor 110 collects electrical signals during a capture period as a representation of the light traveling to image sensor 110 along an optical path 165 so that a scene 125 can be captured as an image. The scene 125 may be captured as one or more point sources. In some embodiments, the image sensor 110 may be coupled to an analog front end (not shown) to process the electrical signals. Image sensor 110 may employ a color filter array (CFA) so that each pixel sensor (not shown) of the image sensor 110 captures different color data. In some embodiments, the CFA is a Bayer CFA, which contains one blue sensor, one red sensor and two green sensors for every four pixel sensors.

The image sensor 110 may be operable to capture several images in succession over several successive capture periods. In one or more embodiments, the capture periods may be in rapid succession. Successive images may capture light reaching image sensor 110 across optical paths that vary from the optical path 165. The successive images may also be captured as multiple frames of a scene (e.g., video), for example from multiple focus settings. Therefore, each image may offer unique pixel array data because light will have traveled a different optical path in reaching image sensor 110. Thus, image sensor 110 may capture a plurality of image data, each set of image data comprising different pixel array data of the same scene 125.

A shutter release 160 can affect a capture period of the image sensor 110. The shutter release 160 can be a component activated by a user, such as a tactile button provided on the housing of the image capturing device 100. Alternatively or in addition to a tactile input, the shutter release 160 may be presented to the user through an interface such as a touch input of the display screen (not shown), as is common in cellular telephones, mobile media devices, and tablet computers. The shutter release 160 can be triggered through other means as well, such as by a timer or other triggering event. A single trigger of the shutter release 160 may result in a plurality of capture periods, e.g. actuation of the shutter release 160 only once may result in the image sensor 110 capturing a plurality of separate images.

In one or more embodiments, the image capture device 100 may include components that allow for movement of the lens 105. Specifically, the camera module 115 may include a lens actuator 170 coupled to the lens 105. The lens actuator 170 may shift the optical path 165 from the lens 105 to the sensor 110 by moving the lens 105, according to one or more embodiments. Activating the lens actuator 170 may change the pointing angle influencing the optical path 165 by translating the lens 105. The lens actuator 170 may produce sufficiently linear translations of the lens 105 across a horizon plane (e.g., x axis) and the picture plane (e.g., y axis).

The image capturing device 100 includes storage 140 that may be operable to store one or more images (e.g., optical samples) captured by image sensor 110. Storage 140 may be volatile memory, such as static random access memory (SRAM) and/or dynamic random access memory (DRAM). Alternatively or in addition to volatile memory, storage 140 may include non-volatile memory, such as read-only memory (ROM), flash memory, and the like. Furthermore, storage 140 may include removable storage devices, such as secure digital (SD) cards. Storage 140 may additionally provide storage of computer readable instructions, data structures, application modules, and other data for image capturing device 100. Accordingly, while storage 140 is illustrated as a single component, storage 140 may comprise a plurality of separate components (e.g., RAM, flash, removable storage, etc.).

The image capturing device 100 includes memory 145 that may be include computer readable instructions executable by processor 155. Particularly, memory 145 may include an autofocus module 150, which may provide functionality for determining a robust lens position for autofocus for a scene. Particularly, as will be discussed in greater detail below, the autofocus module 150 may compute several focus scores for a given region of interest in a scene at each of a plurality of focus settings, and, based on the focus scores, determine an optimal focus setting for a particular region of interest in a scene.

Figure 2:
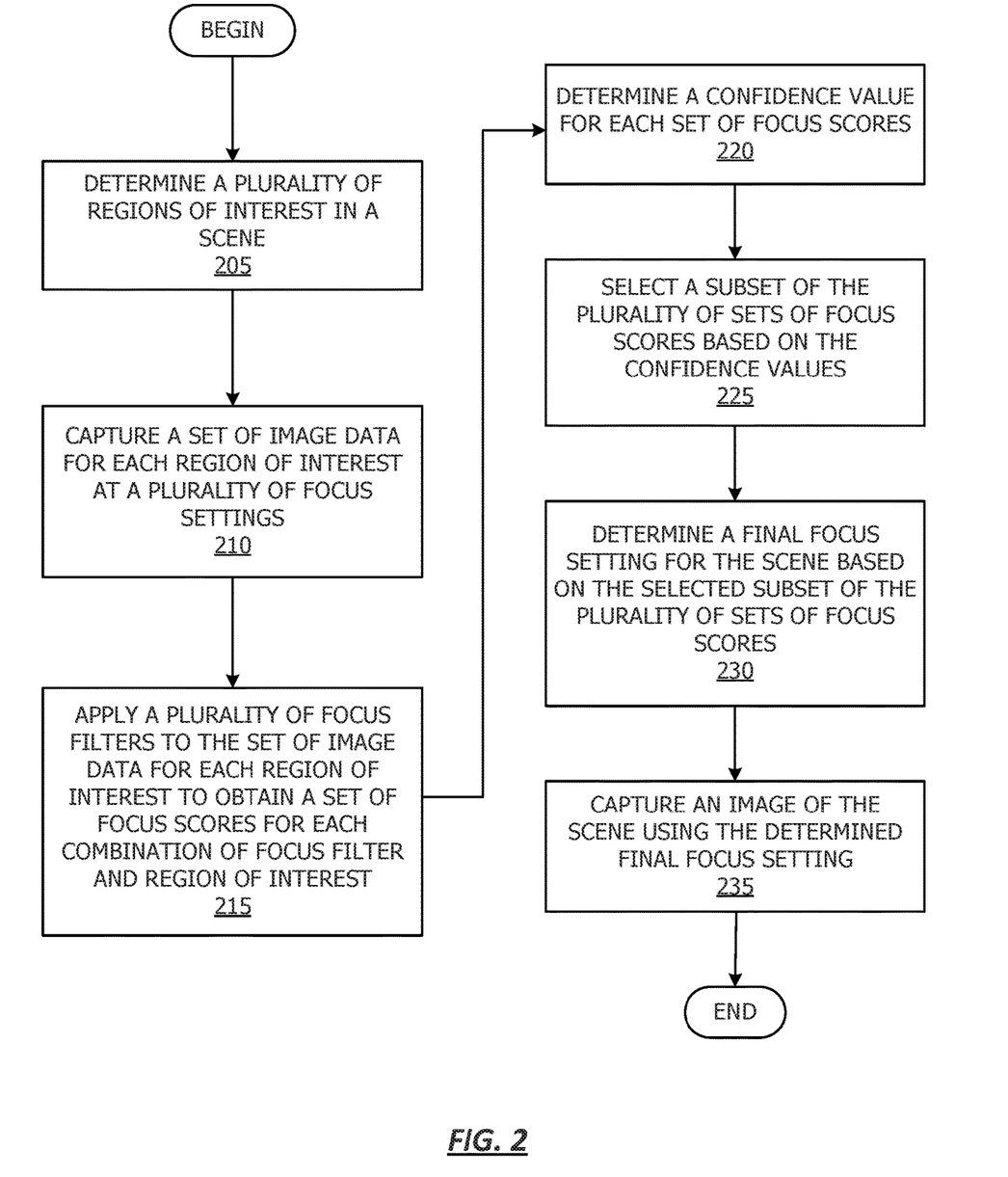
FIG. 2 shows, in flowchart form, a technique for determining a focus setting for autofocus, according to one or more embodiments.

FIG. 2 shows, in flowchart form, a technique for determining a focus setting for autofocus operations, according to one or more embodiments. Although the series of actions are described and depicted in a particular order, it should be understood that in one or more embodiments, one or more of the actions may be removed or replaced. Further, according to one or more embodiments, some of the actions may occur concurrently. In addition, the various actions are described as being performed by components of FIG. 1 for clarity, although the actions may be performed by alternative or additional components than the ones described, according to one or more embodiments.

The flowchart begins at 205, and a plurality of regions of interest of a scene are determined. According to one or more embodiments, the plurality of regions of interest may be derived from an overall region of interest determined using any technique. In one or more embodiments, the overall and/or plurality of regions of interest may be determined based on one or more characteristics of a scene. For example, a region containing a face may be considered a region of interest. In one or more embodiments, the region of interest may be a default portion of the view. As an example, a region of interest may cover a central portion of the camera's field of view, e.g., the central 50% of the camera's field of view. In one or more embodiments, the plurality of regions of interest may be obtained by partitioning the overall determined region of interest into multiple regions of interest. Further, in one or more embodiments, the region of interest may be user-selectable, such as through a touchscreen display of a preview of the scene. In one or more embodiments, an overall region of interest may be partitioned into a predetermined number of regions of interest, or may be partitioned into a plurality of regions of interest based on characteristics of the scene in the overall region of interest. For example, a default number of regions of interest may be, for example, 5×3. For purposes of clarity, the term "region of interest" may refer to one of the plurality of regions of interest (e.g., a single partitioned area of the overall region of interest). Further, in one or more embodiments, the number of regions of interest may be modified based on, for example, user input. As an example, a user may tap a preview display of the scene to change the regions of interest from a default number of regions of interest to another number of regions of interest. Further, in one or more embodiments, the plurality of regions of interest may be different view areas of a scene and not adjacent to each other, or some combination.

The flowchart continues at 210, where image data is captured at a plurality of focus settings to obtain a set of image data for each combination of focus setting and region of interest. According to one or more embodiments, the image data is captured during a focus sweep during which image data is captured for a scene at multiple lens positions. Thus, image data is captured at multiple focus settings for each region of interest. In one or more embodiments, the image data for multiple regions of interest may be captured concurrently, for example during an autofocus sweep. Further, in one or more embodiments, the image data may be captured for an overall region of interest and then partitioned to obtain the plurality of regions of interest. For example, a focus sweep may capture image data for a scene at the multiple focus settings, and the plurality of regions of interest may be determined before the focus sweep, concurrently with the focus sweep, or after the focus sweep (and, optionally, the plurality of regions of interest may be determined based on the image data). In one or more embodiments, the result is, for each region of interest, a set of image data across the multiple focus setting.

At 215, a plurality of focus filters are applied to each set of image data. Said another way, multiple focus filters are applied to the image data to obtain a focus score for each particular combination of region of interest and focus settings. A set of focus scores is obtained for each combination of a focus filter and a set of image data (e.g., the image data for a region of interest across multiple focus settings). In one or more embodiments, applying the focus filter to a set of image data for a particular region of interest results in a graphed focus curve. For example, the focus scores may be graphed on a two dimensional graph for each set of image data for a region of interest, where the x-axis corresponds to focus settings and the y-axis corresponds to focus scores.

Focus filters may include, for example, high pass filters, band pass filters and the like. In one or more embodiments, the focus filters may include different types of filters, or may include a same filter utilizing different variables, or may include filters that apply to different image signals (e.g., different color channels, different image scales, etc). Further, according to one or more embodiments, the plurality of filters may include a combination thereof. In addition, different filters may be applied to different regions of interest, for example, based on characteristics of the region of interest. As an example, at a first light level, a first set of focus filters may be applied, while at a second light level, a second set of focus filters may be applied, where the first and second set of focus filters may or may not overlap.

The flowchart continues at 220, where a confidence value for each set of focus scores is obtained for each region of interest. In one or more embodiments, the confidence value may be based on a signal-to-noise ratio for the set of focus scores. In one or more embodiments, for each region of interest, a confidence value is determined for the set of focus scores obtained from applying each of the filters. As an example, a confidence value may be assigned to each focus curve (e.g., a set of focus scores). A relative sharpness of a focus curve may indicate a particular confidence value. Said another way, if a particular filter applied to image data for a region of interest across multiple focus settings results in a sharp focus curve (e.g., some focus settings are much higher than others), then a high confidence value may be determined. Because multiple focus filters are applied to a single set of image data for region of interest, confidence values may indicate how relatively well a particular focus filter identifies relative sharpness in the scene.

At 225, a subset of the plurality of sets of focus scores (e.g., a subset of the focus curves) are selected based on the associated confidence values. In one or more embodiments, a predetermined number or percentile of the plurality of sets of focus scores may be selected for each sub-region of interest (e.g., the partitioned region of interest), or over all the regions of interest (e.g., the overall region of interest). In one or more embodiments, a predetermined number of filtered data sets (e.g., the filter results for the set of image data across the focal positions) may be selected for each of the plurality of regions of interest, either individually or collectively. In one or more embodiments, the plurality of regions of interest are rank sorted based on the confidence values to determine a relative confidence value for one of more of the regions of interest.

The flowchart continues at 230, where a final focus setting is determined for the scene based on the selected subset of the plurality of sets of focus scores. The focus setting may be determined by considering only some of the filtered data, e.g., from sets of filter scores associated with a sufficient confidence value. As an example, only certain filters applied to a particular region of interest may be considered in determining the focus setting. In one or more embodiments, the final focus setting may be derived from a focus setting associated with one or more the highest focus scores for the selected subset of the plurality of sets of focus scores. In one or more embodiments, the final focus setting may be one of the plurality of focus settings from which the image data was obtained for a region of interest. In another embodiment, the final focus setting may be different than the plurality of focus settings from which the image data was obtained for a region of interest. That is, the camera system may drive the lens to a different position than those used for an autofocus sweep. As an example, if two focus curves (e.g., sets of focus scores) for all the focus scores across all regions of interest for a scene indicate two different focus settings as having the highest focus scores, one of the focus settings may selected, or an average of the two focus settings may be selected. Further, in one or more embodiments, a weighted average may be selected, for example, based on a confidence value associated with each set of focus scores from which the focus settings are obtained.

In one or more embodiments, the final focus setting for the scene may additionally, or alternatively, be determined by determining a regional focus setting for one or more of the plurality of regions of interest. That is, a regional focus setting may be selected by identifying one or more sets of focus scores for a particular region of interest based on confidence values associated with the one or more sets of focus scores, and selecting a regional focus setting based on a focus setting associated with, or derived from, one or more highest focus scores among the identified one or more sets of focus scores for the region. For example, in one or more embodiments, the focus setting for the scene may be selected from among the determined regional focus settings, or it may be derived from the regional focus settings. For example, the final focus setting for the scene may be determined as: an average of the optimal regional focus settings, a regional focus setting that occurs most frequently among the regions of interest (i.e., the mode), a weighted average of the regional focus settings, a median of the regional focus settings, or the like. According to one or more embodiments, a regional confidence value may be assigned to each of the one or more regions of interest, and the regional confidence value may be used to weight one regional focus score against another in determining a final focus score. In one or more embodiments, the regional confidence value may be derived from the confidence values associated with the selected subsets of the plurality of sets of focus scores for the region of interest. Finally, the flowchart concludes at 235, and the camera system captures an image of the scene using the final focus setting. That is, in one or more embodiments, the camera system may drive the lens to a focus setting determined to be the final focus setting for image capture of the scene.

Figure 3:
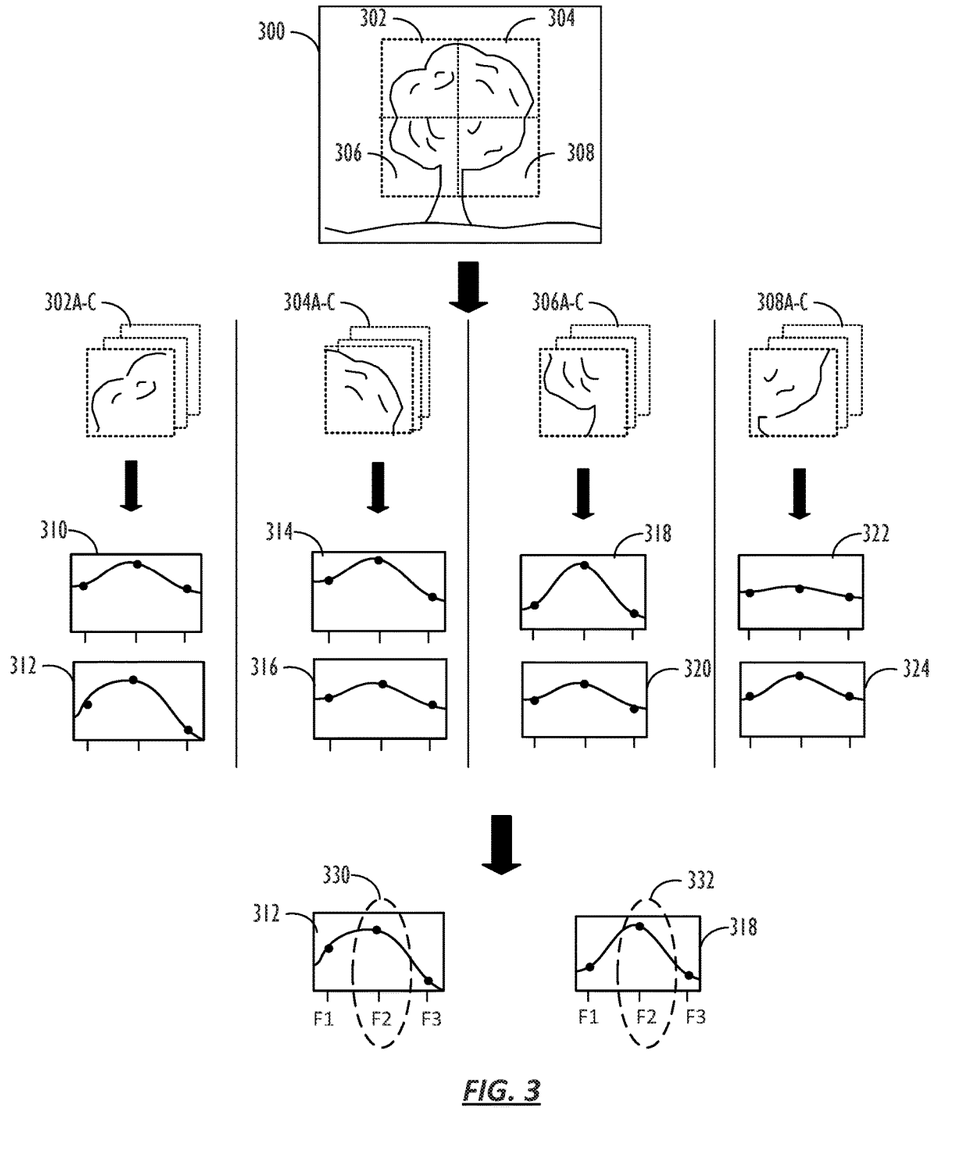
FIG. 3 shows, in flow diagram form, an overall example flow of a technique for determining an optimal focus setting for a scene, according to one or more embodiments.

FIG. 3 shows, in flow diagram form, an overall example flow of a technique for determining an optimal focus setting for a scene, according to one or more embodiments. The flow diagram begins with a view of a scene 300. Within the scene are four regions of interest, 302, 304, 306, and 308. Image data is captured by a camera device for each region of interest at multiple focus settings, for example, using a focus sweep. Thus, as depicted, for purposes of this example, region of interest 302 is captured using three different focus settings to obtain image data 302A-C. Similarly, region of interest 304 is captured using three different focus settings to obtain image data 304A-C, region of interest 306 is captured using three different focus settings to obtain image data 306A-C, and region of interest 308 is captured using three different focus settings to obtain image data 308A-C.

After the image data is captured, a plurality of filters are applied to each set of image data to obtain a plurality of sets of focus scores. That is, a set of focus scores may be determined for each region of interest for a particular filter. For purposes of this example, a first and second filter is applied to image data 302A-C, as well as 304A-C, 306A-C, and 308A-C. The result is a focus score for each combination of focus setting and region of interest. Thus, focus curve 310 depicts three data points related to a focus score for each of 302A, 302B, and 302C when a first filter is applied, whereas focus curve 312 depicts three data points indicating a focus score for each of 302A, 302B, and 302C when a second filter is applied. The x-axis of the focus curve may correspond to focus settings, whereas the y-axis of the focus curve may correspond to focus scores (for example, a sharpness measure). Similarly, focus curve 314 depicts three data points related to a focus score for each of 304A, 304B, and 304C when a first filter is applied, whereas focus curve 316 depicts three data points indicating a focus score for each of 304A, 304B, and 304C when a second filter is applied. In addition, focus curve 318 depicts three data points related to a focus score for each of 306A, 306B, and 306C when a first filter is applied, whereas focus curve 320 depicts three data points indicating a focus score for each of 306A, 306B, and 306C when a second filter is applied. Finally, focus curve 322 depicts three data points related to a focus score for each of 308A, 308B, and 308C when a first filter is applied, whereas focus curve 324 depicts three data points indicating a focus score for each of 308A, 308B, and 308C when a second filter is applied. In one or more embodiments, the first and second filters may be the same for each region of interest, or may vary among the regions of interest.

A subset of the plurality of sets of focus scores is selected based on confidence values. As described above, confidence values may be determined based on a signal to noise ratio. From a graphical viewpoint, a relatively high confidence value may have a more defined peak than a lower confidence value. In one or more embodiments, the subset of the plurality of sets of focus scores may be selected from the overall region of interest among all the sets of focus scores (e.g., among 310, 312, 314, 316, 318, 320, 322, and 324), or may be selected on a per-region of interest basis. For purposes of this example, the subset of the plurality of sets of focus scores are selected from the overall region of interest. Thus, focus curve 312 and focus curve 318 are selected for purposes of this example.

A final focus position may be derived or obtained from the subset of plurality of sets of focus scores (e.g., 312 and 318). In one or more embodiments, the final focus position is selected from, or derived from, a focus setting associated with a peak focus score among the subset of plurality of sets of focus scores. In this example, the peak focus score in 312 is identified at 330 as associated with focus setting F2, and the peak focus score in 318 is identified at 332 as also being associated with focus setting F2. Accordingly, focus setting F2 will be selected for capturing an image of the scene 300.

Figure 4:
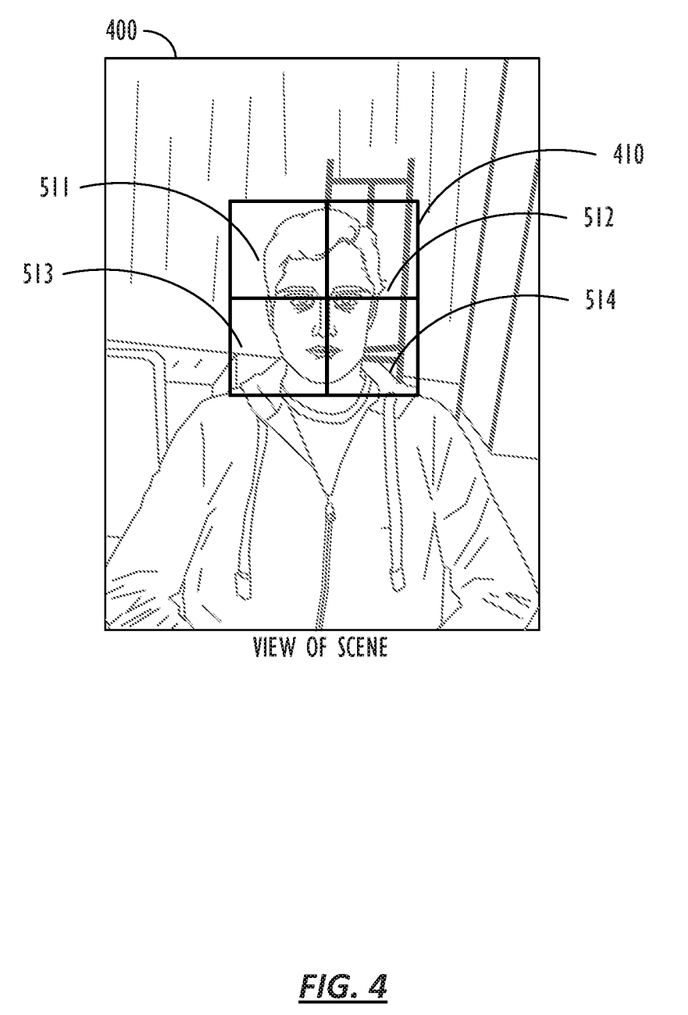
FIG. 4 shows, an example of a set of regions of interest in a view of a scene, according to one or more embodiments.

FIG. 4 shows, an example of a set of regions of interest in a view of a scene, according to one or more embodiments. Specifically, FIG. 4 shows a view of a scene 400, which may correspond to a field of view of a lens of a camera, for example, of an image capture device, such as image capture device 100. As described above, a region of interest may be determined in various ways. For purposes of the example set of regions of interest in FIG. 4, the region of interest 410 corresponds to a portion of the view of the scene corresponding to the face of a person. Further, as depicted, the larger overall region of interest 410 may be portioned into multiple regions of interest, such as the 2×2 grid of subregions of interest 410 shown in FIG. 4. For purposes of this example, the four regions of interest include 511, 512, 513, and 514.

Figure 5:
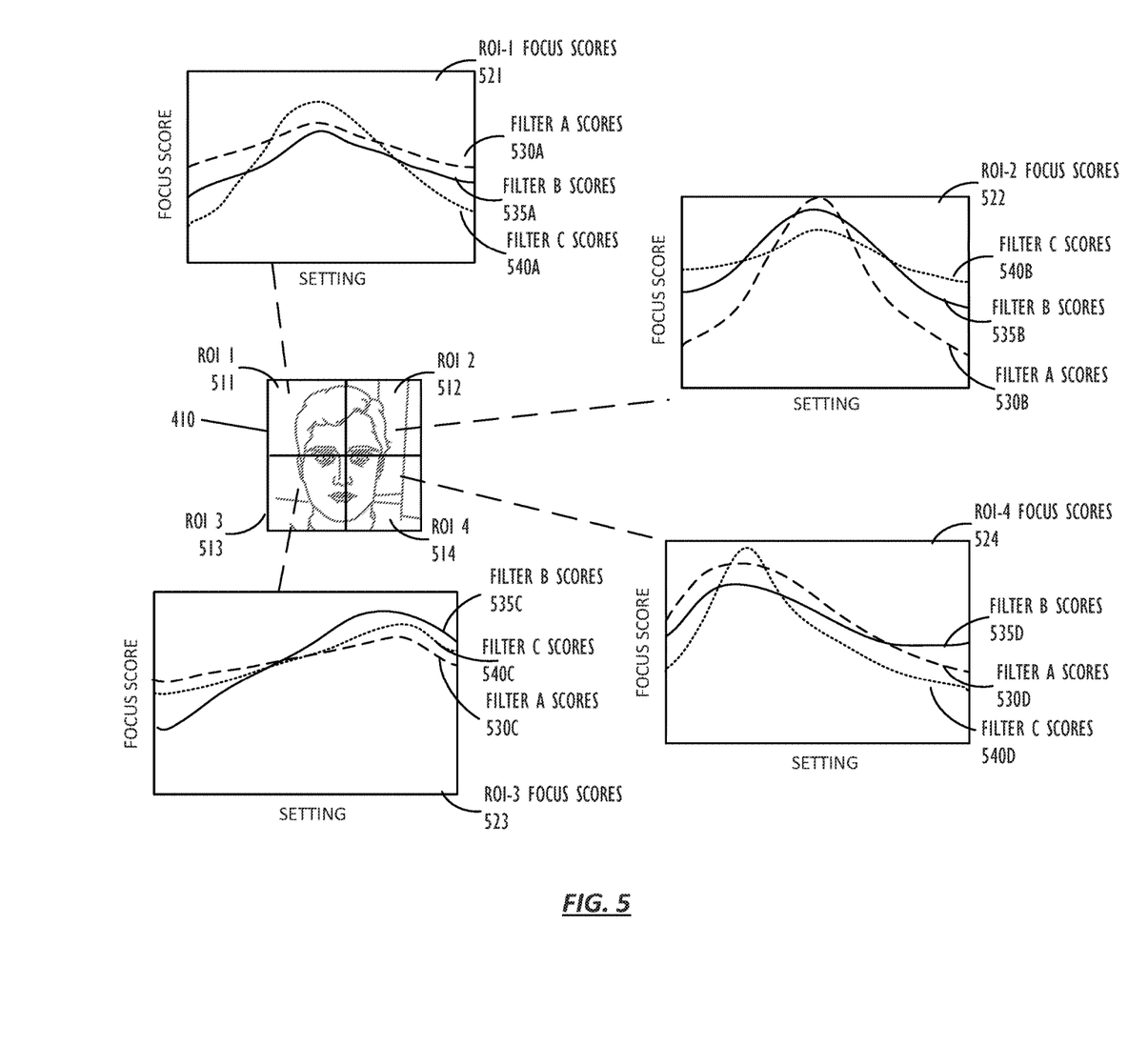
FIG. 5 shows, example filter diagrams utilized for autofocus, according to one or more embodiments.

Turning to FIG. 5, example filter diagrams utilized for autofocus are presented according to one or more embodiments. For purposes of the example, the various depictions in FIG. 5 are described with reference to FIG. 4. Specifically, FIG. 5 shows the overall region of interest 410 is divided into multiple regions of interest (e.g., sub-regions of interest). The plurality of regions of interest include 511, 512, 513, and 514.

As described above, a set of image data is captured for each of the plurality of regions of interest at each of multiple focus settings, to obtain a set of image data for each region of interest, according to one or more embodiments. Then, multiple focus filters are applied to each set of image data for each region of interest. Thus, region of interest 1 (ROI-1) focus scores 521 shows a graphic representation indicating focus scores among the multiple focal positions for region of interest 1 511, according to one or more embodiments. In one or more embodiments, the x-axis may represent a focus setting, or a lens focus position, from infinity on the left edge to macro on the right edge. The y-axis may represent a focus score. The result is three filter curves: filter A scores 530A, filter B scores 535A, and filter C scores 540A, each indicating the various focus scores determined based on the filter for image data captured across multiple focus settings. That is, filter A scores 530A shows a focus curve of focus scores based on filter A for image data captured at each position along a focus sweep for ROI-1 511. Similarly, filter B scores 535A shows an arc of focus scores based on Filter B for image data captured at each position along a focus sweep for ROI-1 511, and filter C scores 540A shows an arc of focus scores from filter C for image data captured at each position along a focus sweep for ROI-1 511.

Similarly to ROI-1 focus scores 521, ROI-2 focus scores 522 shows a graphic representation indicating focus scores among the multiple focus settings for ROI-2 512, according to one or more embodiments. Thus, filter A scores 530A shows a focus curve of focus scores based on filter A for image data captured at each position along a focus sweep for ROI-2 512. Similarly, filter B scores 535B shows a focus curve of focus scores based on Filter B for image data captured at each position along a focus sweep for ROI-2 512, and filter C scores 540B shows a focus curve of focus scores from filter C for image data captured at each position along a focus sweep for ROI-2 512.

Further, ROI-3 focus scores 523 shows a graphic representation indicating focus scores among the multiple focus settings for ROI-3 513, according to one or more embodiments. Thus, filter A scores 530C shows a focus curve of focus scores based on filter A for image data captured at each position along a focus sweep for ROI-3 513. Similarly, filter B scores 535C shows a focus curve of focus scores based on filter B for image data captured at each position along a focus sweep for ROI-3 513, and filter C scores 540C shows a focus curve of focus scores from filter C for image data captured at each position along a focus sweep for ROI-3 513.

Further, ROI-4 focus scores 524 shows a graphic representation indicating focus scores among the multiple focus settings for ROI-4 524, according to one or more embodiments. Thus, filter A scores 530D shows a focus curve of focus scores based on filter A for image data captured at each position along a focus sweep for ROI-4 524. Similarly, filter B scores 535D shows a focus curve of focus scores based on filter B for image data captured at each position along a focus sweep for ROI-4 524, and filter C scores 540D shows a focus curve of focus scores from filter C for image data captured at each position along a focus sweep for ROI-4 524.

Figure 6:
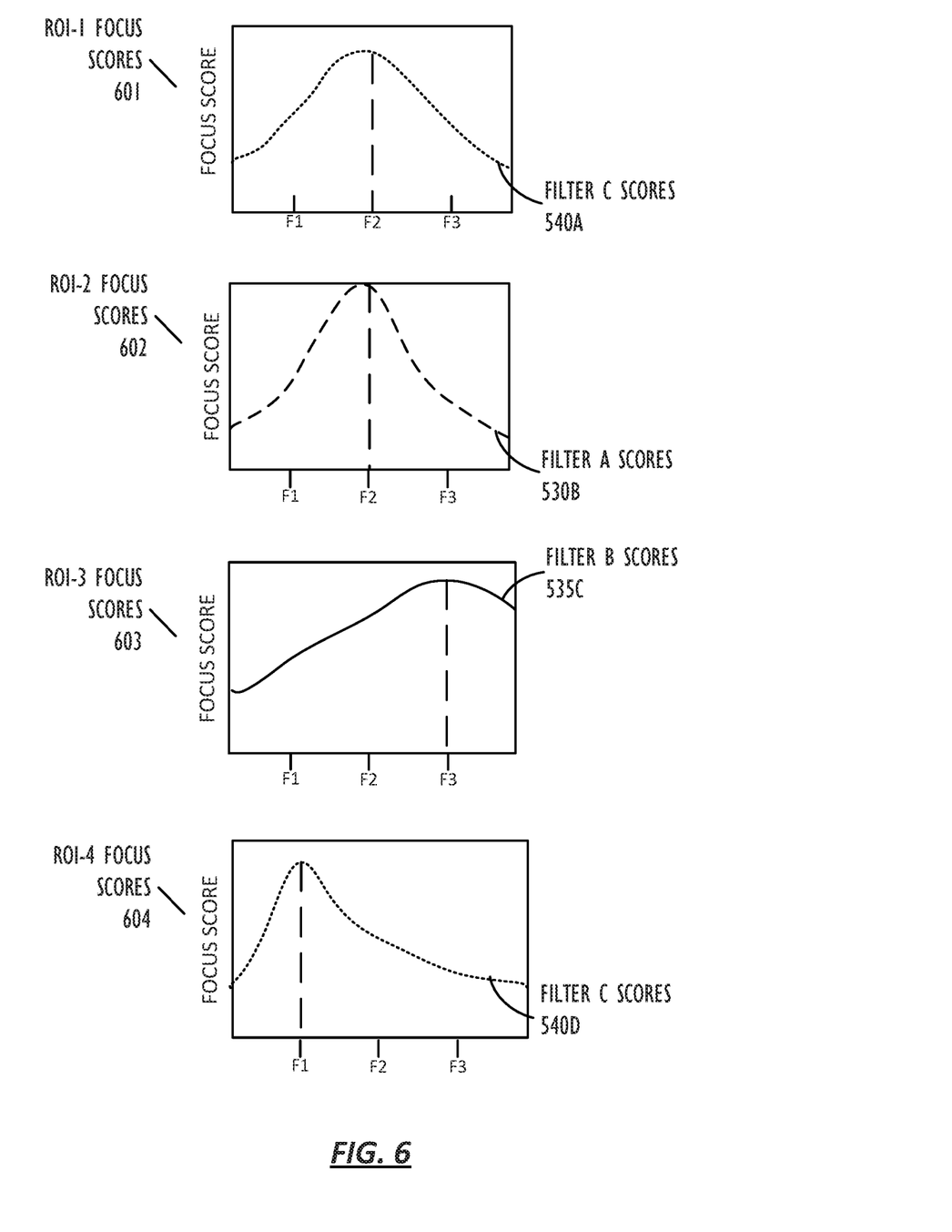
FIG. 6 shows, in block diagram form, a set of focus scores for each region of interest from which a focus setting is determined, according to one or more embodiments.

Turing to FIG. 6, a set of focus scores for each region of interest, from which a final focus setting for the scene is determined, are shown, according to one or more embodiments. As described above, a subset of the plurality of sets of focus scores are selected based on confidence values for the focus scores. In one or more embodiments, the confidence values are used to determine one or more of the most reliable focus filters to use for each region of interest 510. The confidence values may determine which graphed arc associated with a particular filter provides the best, or among the best, signal to noise ratio. According to one or more embodiments, the signal to noise ratio may be estimated based on a distinctiveness of the peak in the graphed arc. In one or more embodiments, by formulating the CBAF problem this way, the ability to identify a focus peak out of noise is increased by analyzing sharpness curves derived from different spatial frequencies and orientations. As such, for ROI-1 focus scores 601 (e.g., corresponding to ROI-1 focus scores 521 of FIG. 5), filter C scores 540A are selected. Similarly, for ROI-2 focus scores 602 (e.g., corresponding to ROI-2 focus scores 522 of FIG. 5), filter A scores 530B are selected, for ROI-3 focus scores 603 (e.g., corresponding to ROI-3 focus scores 523 of FIG. 5), filter B scores 535C are selected, and for ROI-3 focus scores 604 (e.g., corresponding to ROI-3 focus scores 524 of FIG. 5), filter C scores 540D are selected.

Although in the current example one set of filter scores is selected for each region of interest, in one or more embodiments, multiple sets of filter scores may be utilized for one or more regions of interest. Further, in one or more embodiments, not every region of interest may be considered for determining an overall focus setting. In one or more embodiments, the regions of interest may be rank sorted in descending order to signal to noise ratio, or other confidence value measurement. For example, in one or more embodiments, an average confidence value for all sets of focus scores, or one or more selected sets of focus scores for a region of interest may be compared against other average confidence values for other regions. The top percentile, or top total number, of regions of interest may be considered for determining the overall focus setting. As an example, only a predetermined number of sets of filter scores may be considered based on their associated confidence values or based on peak focus scores, and/or the sets of filter scores may be required to satisfy a predetermined threshold confidence value and/or threshold focus score. Thus, as an example, filter B scores 535C may be identified as having the highest confidence value for regional filter scores C 603, but may still not be sufficient to be considered for the overall focus settings.

Thus, in one or more embodiments, only a subset of the plurality of regions of interest may be considered in determining the overall focus settings.

In one or more embodiments, once the subset of sets of focus scores are selected, one or more regional optimal focus settings may be determined. In one or more embodiments, a regional optimal focus setting may be determined based on a peak focus score for the one or more sets of filter scores selected for consideration for each region of interest. In the current example, the optimal focus setting for region of interest A (corresponding to regional filter scores A 601) may be determined as F2. Similarly, the optimal focus setting for region of interest B (corresponding to regional filter scores B 602) may be determined as F2, the optimal focus setting for region of interest C (corresponding to regional filter scores C 603) may be determined as F3, and the optimal focus setting for region of interest D (corresponding to regional filter scores D 604) may be determined as F1. In one or more embodiments, the overall focus setting may be selected from among the optimal focus settings for the regions of interest. Further, the optimal focus setting may be determined based on the optimal focus settings for the regions of interest. As an example, a most frequently occurring focus setting among the regional optimal focus settings may be used. Here, the overall focus setting would be set at F2. As another example, an average focus setting among the regional optimal focus settings may be used. Again, the overall focus setting would be set at F2. Further, in one or more embodiments, an overall focus setting may be based on a weighted average of the selected set of regional optimal focus settings. For example, in one or more embodiments, the overall focus setting may consider the regional optimal focus settings weighted according to their corresponding confidence value.

Figure 7:
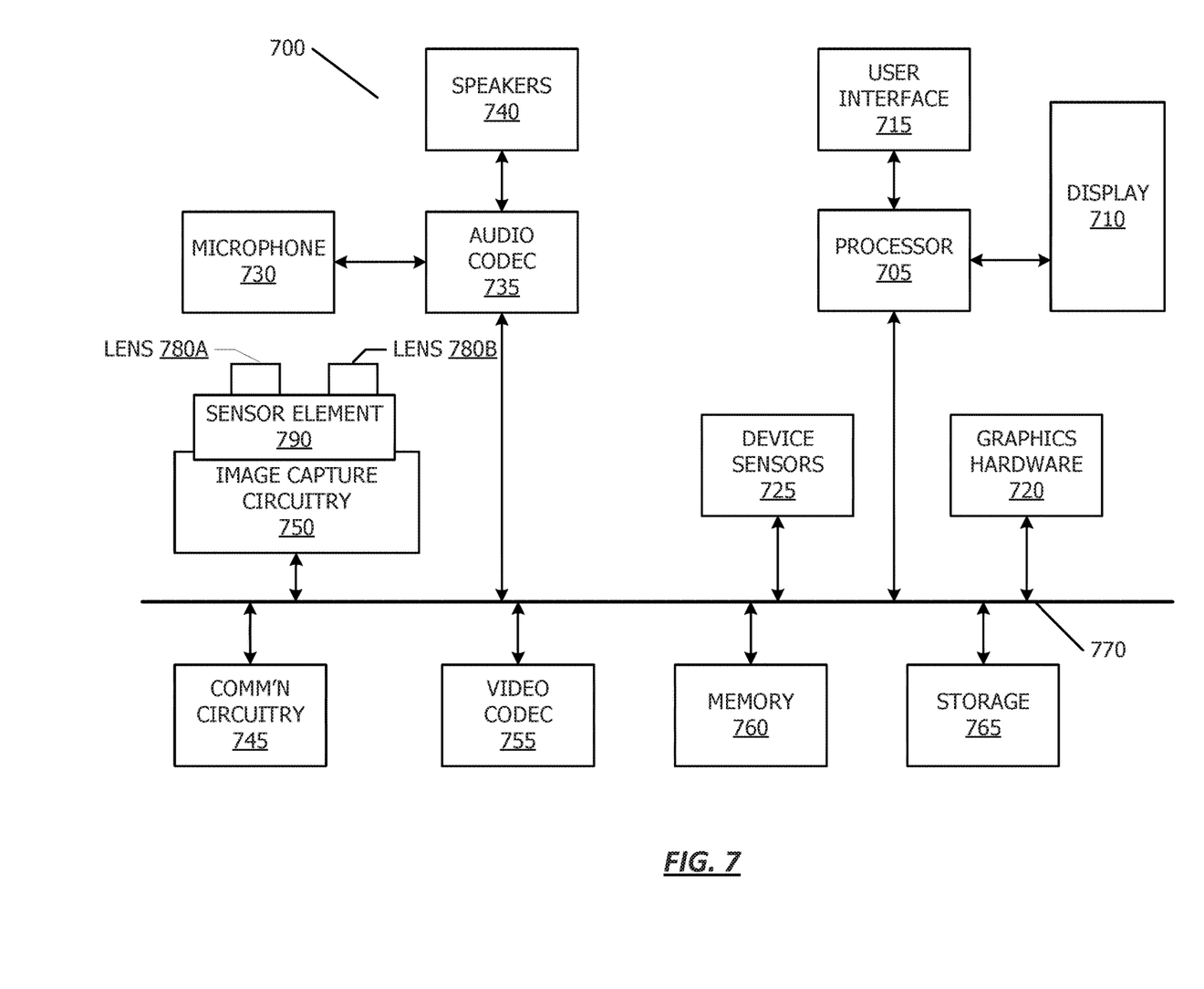
FIG. 7 shows, in block diagram form, a simplified multifunctional device according to one or more embodiments.

Referring now to FIG. 7, a simplified functional block diagram of illustrative multifunction device 700 is shown according to one embodiment. Multifunction electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, digital image capture circuitry 750 (e.g., including camera system 100) video codec(s) 755 (e.g., in support of digital image capture unit 750), memory 760, storage device 765, and communications bus 770. Multifunction electronic device 700 may be, for example, a digital camera or a personal electronic device such as a personal digital assistant (PDA), personal music player, mobile telephone, or a tablet computer.

Processor 705 may execute instructions necessary to carry out or control the operation of many functions performed by device 700 (e.g., such as the generation and/or processing of images and single and multi-camera calibration as disclosed herein). Processor 705 may, for instance, drive display 710 and receive user input from user interface 715. User interface 715 may allow a user to interact with device 700. For example, user interface 715 can take a variety of forms, such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include two (or more) lens assemblies 780A and 780B, where each lens assembly may have a separate focal length. For example, lens assembly 780A may have a short focal length relative to the focal length of lens assembly 780B. Each lens assembly may have a separate associated sensor element 790. Alternatively, two or more lens assemblies may share a common sensor element. Image capture circuitry 750 may capture still and/or video images. Output from image capture circuitry 750 may be processed, at least in part, by video codec(s) and/or processor 705 and/or graphics hardware 720, and/or a dedicated image processing unit or pipeline incorporated within circuitry. Images so captured may be stored in memory 760 and/or storage 755.

Sensor and camera circuitry 750 may capture still and video images that may be processed in accordance with this disclosure, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705 such computer program code may implement one or more of the methods described herein.

In addition to the features described above, other information may be utilized for determining depth in the scene. For example, multiple images captured in succession at different camera positions may provide different information about depth. Further, when the above techniques are utilized in a stereo camera system, a determined depth based on the three images may provide enough information to determine a baseline in the stereo camera. Determining the baseline in a stereo camera system may be used, for example, to recalibrate the camera.

The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A computer readable storage medium comprising computer readable code executable by one or more processors to:

determine a plurality of regions of interest in a view of a scene;

obtain, for each of the plurality of regions of interest, a set of image data for each of a plurality of focus settings;

apply a plurality of focus filters to the set of image data for each of the plurality of focus settings for each of the plurality of regions of interest to obtain a plurality of sets of focus scores;

determine, for each of the plurality of sets of focus scores, a focus curve, wherein the focus curve is derived from a particular set of focus scores across the plurality of focus settings for a particular focus filter of the plurality of focus filters applied to a particular region of the plurality of regions;

determine a confidence value associated with each of the plurality of sets of focus scores, wherein the confidence value indicates a relative performance of a particular focus filter among the plurality of focus filters in identifying relative sharpness for particular image data across the plurality of focus settings based on the focus curve for a particular region;

select a subset of the plurality of sets of focus scores based on the associated confidence values; and determine a final focus setting for the scene based on the selected subset of the plurality of sets of focus scores.

2. The computer readable storage medium of claim 1, wherein one or more of the plurality of focus filters are adapted based on characteristics of the scene.

3. The computer readable storage medium of claim 1, wherein the subset of the plurality of sets of focus scores are selected by comparing confidence values associated with each of the plurality of sets of focus scores to a threshold confidence value.

4. The computer readable storage medium of claim 1, wherein the subset of the plurality of sets of focus scores are selected by based on a predetermined percentile of highest confidence values among the confidence values associated with each of the plurality of sets of focus scores.

5. The computer readable storage medium of claim 1, wherein the plurality of focus setting comprises a plurality of autofocus positions, and wherein the final focus setting comprises a focus position that is not included in the plurality of autofocus positions.

6. The computer readable storage medium of claim 1, wherein the computer readable code to select the subset of the plurality of sets of focus scores further comprises computer readable code to:

select, for each region of interest, from among the plurality of sets of focus scores associated with the region of interest, one or more sets of focus scores based on the confidence values associated with each of the one or more sets of focus scores, to obtain one or more sets of focus scores for each of one or more regions of interest.

7. The computer readable storage medium of claim 6, wherein the computer readable code to determine a final focus setting comprises computer readable code to:

determine a regional focus setting for one or more of the regions of interest based on the one or more sets of focus scores for each of one or more regions of interest; and determine the focus setting based on the regional focus setting for the one or more of the regions of interest.

8. An image capture system, comprising:
a camera;
one or more processors; and
memory coupled to the one or more processors and comprising computer readable code executable by the one or more processors to:
determine a plurality of regions of interest in a view of a scene;

obtain, for each of the plurality of regions of interest, a set of image data for each of a plurality of focus settings;

apply a plurality of focus filters to the set of image data for each of the plurality of focus settings for each of the plurality of regions of interest to obtain a plurality of sets of focus scores;

determine, for each of the plurality of sets of focus scores, a focus curve, wherein the focus curve is derived from a particular set of focus scores across the plurality of focus settings for a particular focus filter of the plurality of focus filters applied to a particular region of the plurality of regions;

determine a confidence value associated with each of the plurality of sets of focus scores, wherein the confidence value indicates a relative performance of a particular focus filter among the plurality of focus filters in identifying relative sharpness for particular image data across the plurality of focus settings based on the focus curve for a particular region;

select a subset of the plurality of sets of focus scores based on the associated confidence values; and determine a final focus setting for the scene based on the selected subset of the plurality of sets of focus scores.

9. The system of claim 8, wherein one or more of the plurality of focus filters are adapted based on characteristics of the scene.

10. The system of claim 8, wherein the subset of the plurality of sets of focus scores are selected by comparing confidence values associated with each of the plurality of sets of focus scores to a threshold confidence value.

11. The system of claim 8, wherein the subset of the plurality of sets of focus scores are selected by based on a predetermined percentile of highest confidence values among the confidence values associated with each of the plurality of sets of focus scores.

12. The system of claim 8, wherein the plurality of focus setting comprises a plurality of autofocus positions, and wherein the final focus setting comprises a focus position that is not included in the plurality of autofocus positions.

13. The system of claim 12, wherein the computer readable code to select the subset of the plurality of sets of focus scores further comprises computer readable code to:

select, for each region of interest, from among the plurality of sets of focus scores associated with the region of interest, one or more sets of focus scores based on the confidence values associated with each of the one or more sets of focus scores, to obtain one or more sets of focus scores for each of one or more regions of interest.

14. The system of claim 13, wherein the computer readable code to determine a final focus setting comprises computer readable code to:

determine a regional focus setting for one or more of the regions of interest based on the one or more sets of focus scores for each of one or more regions of interest; and determine the focus setting based on the regional focus setting for the one or more of the regions of interest.

15. A method for determining a focus setting, comprising:
determining a plurality of regions of interest in a view of a scene;
obtaining, for each of the plurality of regions of interest, a set of image data for each of a plurality of focus settings;

applying a plurality of focus filters to the set of image data for each of the plurality of focus settings for each of the plurality of regions of interest to obtain a plurality of sets of focus scores;

determining, for each of the plurality of sets of focus scores, a focus curve, wherein the focus curve is derived from a particular set of focus scores across the plurality of focus settings for a particular focus filter of the plurality of focus filters applied to a particular region of the plurality of regions;

determining a confidence value associated with each of the plurality of sets of focus scores, wherein the confidence value indicates a relative performance of a particular focus filter among the plurality of focus filters in identifying relative sharpness for particular image data across the plurality of focus settings based on the focus curve for a particular region;

selecting a subset of the plurality of sets of focus scores based on the associated confidence values; and determining a final focus setting for the scene based on the selected subset of the plurality of sets of focus scores.

16. The method of claim 15, wherein one or more of the plurality of focus filters are adapted based on characteristics of the scene.

17. The method of claim 15, wherein the subset of the plurality of sets of focus scores are selected by comparing confidence values associated with each of the plurality of sets of focus scores to a threshold confidence value.

18. The method of claim 15, wherein the subset of the plurality of sets of focus scores are selected by based on a predetermined percentile of highest confidence values among the confidence values associated with each of the plurality of sets of focus scores.

19. The method of claim 15, wherein selecting the subset of the plurality of sets of focus scores further comprises:

selecting, for each region of interest, from among the plurality of sets of focus scores associated with the region of interest, one or more sets of focus scores based on the confidence values associated with each of the one or more sets of focus scores, to obtain one or more sets of focus scores for each of one or more regions of interest.

20. The method of claim 19, wherein determining the final focus setting comprises further comprises:

determining a regional focus setting for one or more of the regions of interest based on the one or more sets of focus scores for each of one or more regions of interest; and determining the focus setting based on the regional focus setting for the one or more of the regions of interest.

* * * * *